United States Patent [19]
Schmidt

[11] 3,828,551
[45] Aug. 13, 1974

[54] MAIN STREAM LIQUID-FUEL ROCKET ENGINE CONSTRUCTION AND METHOD OF STARTING A LIQUID-FUEL ROCKET ENGINE

[75] Inventor: Günther Schmidt, Unterhaching, Germany

[73] Assignee: Messerschmitt-Bolkow-Blohm Gesellschaft Mit Beschrankter Haftung, Munchen, Germany

[22] Filed: Nov. 1, 1972

[21] Appl. No.: 302,772

[30] Foreign Application Priority Data
Nov. 10, 1971  Germany............................ 2155786

[52] U.S. Cl....................... 60/204, 60/244, 60/259, 60/260, 60/39.14
[51] Int. Cl.............................................. F02k 9/02
[58] Field of Search ............. 60/246, 259, 260, 244, 60/245, 204, DIG. 8, 39.14

[56] References Cited
UNITED STATES PATENTS

| | | | |
|---|---|---|---|
| 2,408,111 | 9/1946 | Truax et al. ........................... | 60/260 |
| 3,170,295 | 2/1965 | Dryden ............................. | 60/259 X |
| 3,524,319 | 8/1970 | Stockel ................................ | 60/259 |
| 3,577,735 | 5/1971 | Schmidt ............................ | 60/261 X |

Primary Examiner—William L. Freeh
Assistant Examiner—Robert E. Garrett
Attorney, Agent, or Firm—McGlew and Tuttle

[57] ABSTRACT

A method of starting a liquid-fuel rocket engine of the so-called "main stream" construction which has at least one precombustion chamber, a main combustion chamber and a turbine located in the flow path of the gases between the two combustion chambers which is operated to drive the propellant component pumps and using at least one ignition chamber comprises, directing propellant components into the ignition chamber and igniting them to produce gases, preferably oxygen-rich gases, directing the produced gases to the precombustion chamber for flow therethrough and through the turbine and main combustion chamber to preheat them and to run the turbine to drive the propellant component pumps, and after the pumps come up to an operating speed, discharging the propellant components to said precombustion chamber and said main combustion chamber to produce propellant gases in the preheated main combustion chamber. The apparatus which is employed includes valve controls, such as throttle valves, for regulating the supply of the components to the ignition chamber and for shutting off the ignition chamber from operation. The arrangement is such that the ignition chamber can be operated subsequently for the reignition of the rocket engine if desired.

5 Claims, 1 Drawing Figure

PATENTED AUG 13 1974         3,828,551
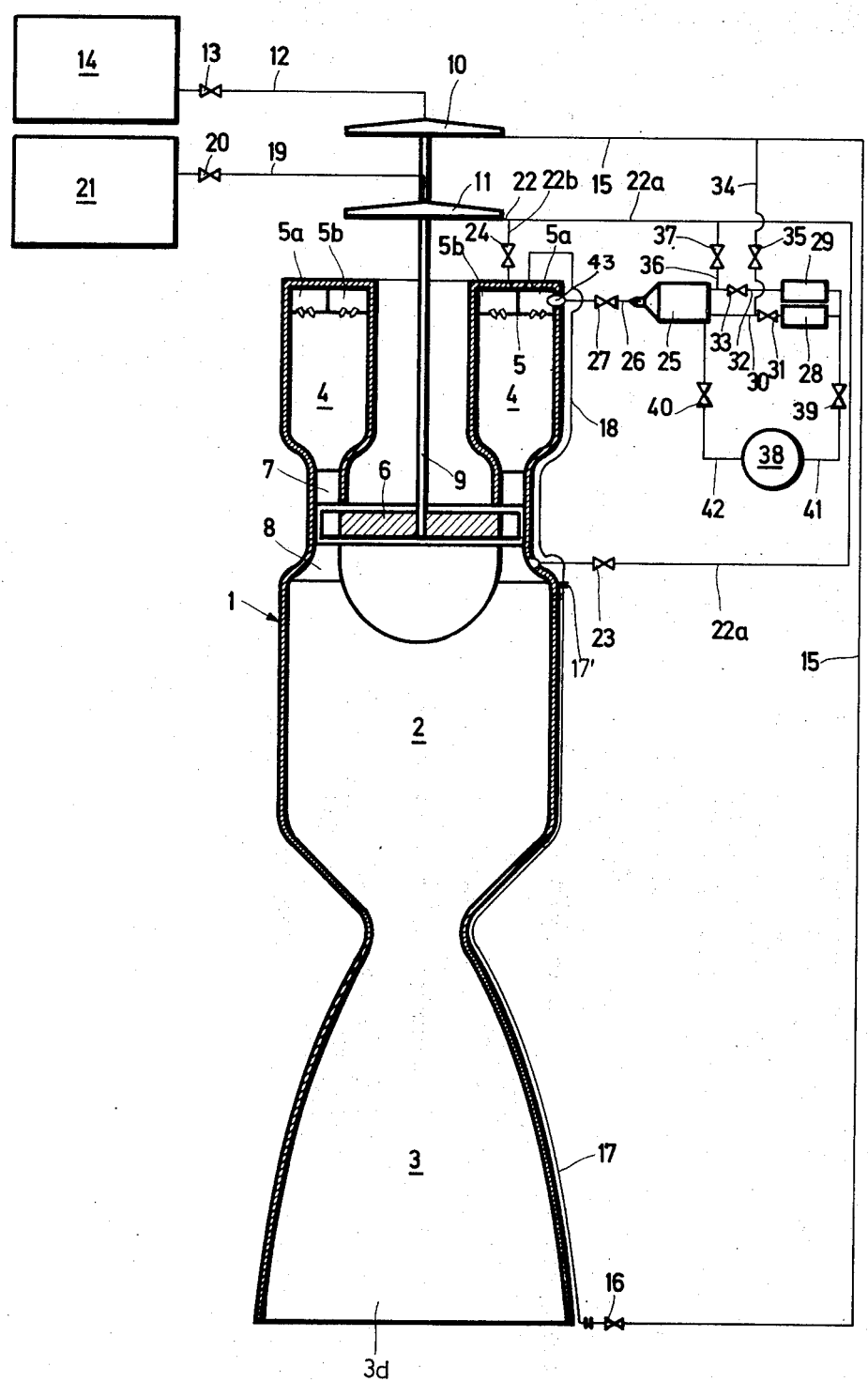

MAIN STREAM LIQUID-FUEL ROCKET ENGINE CONSTRUCTION AND METHOD OF STARTING A LIQUID-FUEL ROCKET ENGINE

BACKGROUND OF THE INVENTION

1. Field of the Invention

This invention relates in general to the construction and operation of rocket engines and, in particular, to a new and useful method of starting a liquid-fuel rocket engine, and to an improved construction of a liquid-fuel rocket engine of the "main stream" type.

2. Description of the Prior Art

In liquid-fuel rockets of the so-called "main stream" construction, an oxidizer or fuel-rich propellant gas is produced during the full load operation of the precombustion chamber or chambers. The oxidizer or fuel-rich propellant gas is then expanded in one or more turbines which drive auxiliary elements such as the propellant pumps. After the gas expands to perform work in its expansion through the turbine, it is fed into the main combustion chamber where it reacts further with directly injected fuel or oxidizer. The starting of such a liquid-fuel rocket engine is very difficult and it presents many problems. Ignition of the precombustion chamber or chambers before the main combustion chamber leads to a great acceleration of the turbine or turbines because of a lack of a counterpressure. If the main combustion chamber does not go into operation at the right time, this involves the danger of exceeding the maximum speed of the turbine pump drive as set by its mechanical strength.

In order to eliminate the danger mentioned above, when using cryogenic rocket propellants, and with regenerative engine cooling, the starting process is initiated by one of the cryogenic propellant components, for example liquid oxygen, as the main combustion chamber is ignited and taken into operation. Only after the operating pressure in the main combustion chamber has been brought up to a desired amount are the precombustion chamber or chambers connected. The required energy for the starting acceleration of the turbine pump drive is supplied from the heat capacity of the main combustion chamber in relation to the cryogenic fuel component, for example liquid oxygen, which flows through its cooling channels. In fact, the fuel vapors occuring in the combustion chamber cooling channels due to the heating of the walls, provide on the basis of a pressure of several atmospheres in the respective propellant tanks, for the starting of the turbine pump drives for the propellants, even though such a start is a sluggish one.

When using storable liquid propellants, the starting process mentioned above is out of the question. The reason for this is the virtual lack of heat capacity of the combustion chamber in relation to the propellants of the type in question at room temperatures. Consequently, a vapor formation in the combustion chamber cooling channels traversed by a propellant component, such as nitrogen tetroxide ($N_2O_4$), does not occur as long as these channels are not preheated.

In a known starting process for liquid-fuel rocket engines of the "main stream" type, operated with nitrogen tetroxide and unsymmetrical dimethyl hydrazone, combustion chamber cooling channels are preheated by direct heating of the main combustion chamber. For this purpose, adequate propellant quantities of an oxidizer-rich gas of, for example, 150°C, are directed through the cooling channels when they are empty in order to preheat them. Following this preheating of the empty combustion chamber cooling channels, the transport of the nitrogen tetroxide from the appropriate tank through the respective turbine-driven pump and the preheated cooling channel system is initiated by the prevailing tank pressure of several atmospheres, in analogy to the starting process of the rocket engines of the "main stream" construction which are operated by cryogenic propellants. The conveyed nitrogen tetroxide evaporates in the preheated cooling channels, passes from there into the precombustion chamber and expands after issuance therefrom with a release of energy in the after-connected turbine. This sets the propellant pumps in motion by the driving of the turbine. As soon as the propellant pumps reach a given feed pressure, the supply line for the unsymmetrical dimethyl hydrazine which leads to the main combustion chamber injector head is cleared. The unsymmetrical dimethyl hydrazine thus flowing directly into the main combustion chamber burns therein, together with the nitrogen tetroxide previously evaporated in the cooling channels, and is expanded after issuance from the precombustion chamber in the turbine which is connected downstream thereof. This ensures a continuous preheating of the cooling channel system and a continuous movement of the propellant. Experience has shown that this results in a steady engine performance at about 10 percent of the rated pressure of the main combustion chamber.

It should be mentioned at this point that in rocket engines of the main stream type, it is customary to design for a cooling pressure drop in the nitrogen tetroxide between the respective pump exit and the precombustion chamber of, for example at least 100 atm, which far exceeds that required for the injection of the unsymmetrical dimethyl hydrazine into the precombustion chamber, which is 60 atm., for example. It is this comparatively small difference between the high pressure of the pump delivering unsymmetrical dimethyl hydrazine and the pressure of the precombustion chamber, which makes it difficult to take the latter into operation. The dead time for the filling up of the respective line system up to the correlated precombustion chamber injection nozzles amounts to several seconds and, moreover, it is not always the same time each operation. For reasons already mentioned, ignition of the pre-combustion chamber must occur only after the main combustion chamber has been taken into operation and, therefore, a very rapid succession of various switching and control functions is necessary and these switching requirements come close to the switching time limits of commercial switching and control elements.

The last-described known starting process has two additional disadvantages: For one thing, the integration of the injection system for the heating up of the main combustion chamber with the injector head for normal operation and, in addition, its switching from operation with liquid nitrogen tetroxide to turbine exhaust gases causes considerable difficulties. For another thing, with this starting process, the precombustion chamber and the turbine are also not heated up. This results in the evaporation of the nitrogen tetroxide in the preheated cooling channels and its recondensing in the precombustion chamber so that it forms an uncontrollable accumulation of liquid therein.

SUMMARY OF THE INVENTION

In accordance with the invention, there is provided a liquid-fuel rocket engine of the so-called "main stream" type, having at least one precombustion chamber, a main combustion chamber and a turbine located between the precombustion chamber and the main combustion chamber in the flow stream of the gases therebetween for operation by the gases to drive the propellant component pumps of different feed pressure, and preferably used with a regenerative engine cooling and which includes a starting process which avoids the disadvantages of the known starting processes.

This is accomplished, in accordance with the invention, by providing at least one ignition chamber which is first supplied with propellant components from supplementary supply tanks which are pressurized, for example by a pressure gas tank. The propellant components are admitted into the ignition chamber and ignited to produce oxidizer or fuel-rich propellant gases which are directed into the precombustion chamber and subsequently passed through the turbine into the main combustion chamber in order to preheat all of them. With the inventive process, the gases generated in the ignition chamber flow from the precombustion chamber through the turbine to set the turbine in motion and to drive the propellant component pumps.

After the propellant component pumps are brought into operation, additional propellant components are fed to the ignition chamber and to the precombustion chamber as well as to the main combustion chamber where the gases exiting from the turbine are combined with a propellant component to form propellant gases therein which are discharged through a thrust nozzle.

With the inventive process, liquid-fuel rocket engines of the main stream type can be started or restarted after idling in a controlled manner, regardless of whether cryogenic or storable propellants are employed for the energy production. Starting and restarting can be effected in a controlled manner and "soft," this being of great advantage for future reusable space shuttles, among other things. A specific pre-pressure in the propellant main tanks is not necessary and this makes the tank construction much more simple. In addition, the danger that the propellant component evaporates in the cooling channels of the preheated main combustion chamber and initially condenses on passing into the precombustion chamber to form uncontrollable explosive accumulations of liquid therein, is eliminated.

The two last-mentioned advantages are attributable to the simultaneous preheating of the precombustion chamber or chambers, the main combustion chamber and the turbine or turbines, as well as to the acceleration of the turbines by the oxidizer or fuel-rich gases having a temperature of from about 150° to 200°C and a pressure of about 30 atm. when they are delivered from the ignition chamber. The cross-section of the ignition chamber and the effective tubine cross-section are matched so that the gas flowing from the ignition chamber into the precombustion chamber will build up in the precombustion chamber, a comparatively low pressure of about 2 atms., for example; and after release of its energy in the turbine, will flow through the main combustion chamber under pressure.

As a further feature of the invention, the ignition chamber is supplied with propellant initially (for example up to a turbine speed of about 12,000 rpm corresponding to a pump high pressure of about 50 atm) by means of a pressure gas from auxiliary tanks. After the pumps are running steadily, propellant components from the main tanks are supplied to the ignition chamber by the action of the now steadily running propellant pumps. The closing of the initially open shut-off valves in the connection lines between the pressure gas tanks and the auxiliary propellant tanks, as well as between the auxiliary tanks and the ignition chamber, and the opening of the initially closed shut-off valves in the connection between the pump high pressure lines and the ignition chamber, is advantageously effected automatically, for example as a function of the pump pressure.

For better mixture preparation, according to another developing feature of the invention, the oxidizer or fuel conveyed on a higher end pressure is, before being fed into the preheated precombustion chamber or chambers, intimately mixed with the oxidizer or fuel-rich gas from the ignition chamber or chambers.

In the main combustion chamber, the oxidizer or fuel flowing through the precombustion chamber or chambers and the turbine or turbines reacts, without preparatory reaction, with directly fed fuel or oxidizer. In the course of operation of the pure main combustion chamber, the operating pressures in the main combustion chamber rise to, for example about 20 atmospheres, and in the precombustion chamber or chambers to, for example, 22 atmospheres. The thrust level can be adjusted in this state of operation in a small range by regulation of the ignition chamber or chambers.

The production of an oxidizer or fuel-rich propellant gas in the precombustion chamber sets in as soon as the pressure difference building up during the pure main combustion chamber operation between the exit of the fuel or oxidizer pump delivering on the lower end pressure and said precombustion chamber, is sufficient for satisfactory feeding of fuel or oxidizer into the precombustion chamber.

The practice of the starting process, according to the invention, is particularly simple with a comparatively small ignition chamber which communicates with the precombustion chamber and using auxiliary tanks which are filled with an oxidizer and a fuel, respectively. In addition, a pressure gas tank containing, for example nitrogen, and which is connected to the auxiliary tanks through a shut-off valve system, provides a means for applying pressure to the propellant components in the auxiliary tanks in order to direct them into the precombustion chamber. The ignition chamber can continue to be operated in the entire control range up to the full load point of the engine even if the connection between the various fuel tanks and the ignition chamber and precombustion chamber are controlled by fixed throttles instead of adjustable control valves. If operational or control technical reasons require the shutting off of the ignition chamber, this may be done by closing the valves to the supply tanks and then closing off the connection of the ignition chamber to the precombustion chamber. The shut-off system is preferably such that a scavenging of the ignition chamber with nitrogen from the fluid pressure supply tank may be effected. This assures that re-ignition of the engine immediately after the end of the combustion process can take place. If the time interval between the end of combustion and the re-ignition of the engine is small, a continuous ignition chamber operation is advisable.

Accordingly, it is an object of the invention to provide an improved process of starting a liquid-fuel rocket engine of the main stream type which has a precombustion chamber and a main combustion chamber with an auxiliary pump drive turbine disposed in the gas passage from the precombustion chamber to the main chamber for operation by the gases to drive the propellant component pumps and which comprises directing propellant components into an ignition chamber and igniting them to produce gases which are directed into the precombustion chamber, the turbine and the main combustion chamber in order to preheat them, and after the turbine comes up to speed, connecting the discharge of the propellant components to the precombustion chamber and the main combustion chamber to produce propellant gases in the main combustion chamber.

A further object of the invention is to provide a liquid-fuel rocket engine which includes an ignition chamber with pressure means for directing propellant components into the ignition chamber to initiate combustion therein and with a connection from the ignition chamber to a precombustion chamber for flow therethrough and through a turbine to drive the auxiliary propellant component pumps and through a main combustion chamber and with means for connecting the discharges of the propellant component pumps to supply propellant components to the precombustion chamber and the main combustion chamber.

A further object of the invention is to provide a liquid-fuel rocket engine of the "main stream" type, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing comprises a schematic axial sectional view and diagrammatic flow system of a liquid-fuel rocket engine constructed in accordance with the invention.

GENERAL DESCRIPTION OF THE PREFERRED EMBODIMENT

Referring to the drawing in particular, the invention embodied therein, comprises a liquid-fuel rocket engine 1, of the so-called "main stream" type, which includes a regeneratively cooled main combustion chamber 2 having a thrust nozzle 3 terminating a thrust gas discharge 3a. The engine 1 also includes a precombustion chamber 4 arranged before the main combustion chamber 2 and having an injector head portion 5. The precombustion chamber 4 discharges gases which are generated therein through a lead grid 7 through the blades of a turbine 6 and through a delay lag grid 8 into the main combustion chamber 2. The auxiliary turbine 6 includes a turbine shaft 9 which is connected to drive two propellant component pumps 10 and 11, respectively.

The propellant component supply system includes a first main tank 14 filled, for example, with a nitrogen tetroxide ($N_2O_4$), and it is connected to the pump 10 through a suction line 12 having shut-off valve means 13.

The pump 10 which is connected through the suction line 12 to the main tank 14 which is filled with nitrogen tetroxide has a discharge which connects to a pressure line 15 which extends to the nozzle discharge end of the main combustion chamber 2 and it is connected to a header which communicates with a plurality of longitudinally extending cooling channels 17 defined in the wall of the combustion chamber. Shut-off means in the form of a valve 16 is located directly at the connection to the cooling tube header of the combustion chamber 2. The tubes 17 are all connected to an annular collecting duct or header 17' at the front end or head of the combustion chamber 2. A feed line 18 connects from the header 17' to the oxidizer section 5a of a head portion 5 of the precombustion chamber 4.

The other pump 11, which is also driven by the turbine 6, has a suction which is connected to a suction line 19 which in turn is connected to a main tank 21 which is filled, for example, with an unsymmetrical dimethyl hydrazine (UDMH). The supply of the fuel from the tank 21 is regulated by a shut-off means in the form of a valve 20. The pump 11 discharges into a pressure line 22 which connects into two separate conductor branches 22a and 22b. One branch 22a discharges into the delay lag grid 8 and flow therethrough may be regulated by a shut-off means, such as a valve 23. The other branch 22b connects into the fuel section 5b of the injector head 5 and flow therethrough is regulated by shut-off means, such as a valve 24.

An ignition or starting chamber 25 is associated with the rocket engine 1, and it provides a means for supplying gases for preheating the precombustion chamber 4, the turbine 6 and the main combustion chamber 2. For this purpose, the ignition chamber has a discharge line 26 which connects into the oxidizer section 5a of the injector head 5 of the precombustion chamber 4. Shut-off means in the form of a valve 27 is located in the discharge line 26 and advantageously regulates the tangential discharge into the injector head section 5a. The valve 27 makes it possible to isolate the ignition chamber from the precombustion chamber 4.

Means are provided to supply the ignition chamber 25 with propellant components, including auxiliary tanks 28 and 29 for oxidizer and fuel, respectively, which are connected through lines 30 and 32 having shut-off means 31 and 33, respectively, to the ignition chamber 25. The line 30 is also connected to a cross connection 34 which connects to the discharge line 15 and which has shut-off means 35. The line 32 is connected through a crossover line 36 having shut-off means or valve 37 which is connected at its opposite end to the pressure line 22a which leads from the pump 11 to the grid 8 of the combustion chamber 2. The delivery of the propellant components and the evacuation of the auxiliary tanks 28 and 29 is effected by means of a pressure gas, such as nitrogen, which is contained in a pressure gas tank 38 and which is supplied through a connecting conduit 41 having a regulating valve 39. The connecting line 42 extends from the pressure gas tank 38 to the ignition chamber 25 and it is regulated by a valve 40. In accordance with the method of the invention, the liquid fuel rocket engine 1 of the main stream type is started as follows:

First, the two auxiliary tanks 28 and 29 are pressurized with gas from the nitrogen tank 38 in which there prevails, for example, a pressure of about 100 atmospheres. This is done by opening the valve 39 in the line 41. At the same time, the valves 31 and 33 in the supply lines 31 and 32 which lead from the auxiliary tanks 28 and 29 to the ignition chamber 25 are opened, which permits the flow of the oxidizer and the fuel into the ignition chamber. The two propellant components from the auxiliary tanks 28 and 29 are so matched as to quantity that they produce after ignition in the ignition chamber 25, for example, an oxidizer-rich gas at a temperature of about from 150° to 200°C and a pressure of about 30 atm. This gas enters the precombustion chamber 5 through the injector system in the oxidizer section 5a of the head 5 and the oxidizer comprises, for example nitrogen tetroxide ($N_2O_4$). By proper adaptation of the ignition chamber exit cross-section and the effective turbine cross-section of the turbine 6, there results, in the precombustion chamber 4, a pressure of about 2 atm. The gas which is directed out of the ignition chamber 25 passes from the precombustion chamber 4 through the turbine 6 into the main combustion chamber 2. The gases expand in moving through the turbine 6 to rotate the turbine up to a speed of approximately 12,000 rpm, for example. At this operating speed, the pump pressures of the pumps 10 and 11 are about 50 atm. After the turbine pumps 10 and 11 have reached this state of operation, the propellants are no longer supplied from the chambers 28 and 29 to the ignition chamber 25 but rather directly from the pumps 10 and 11 and, for this purpose, valves 35 and 37 are automatically opened into the associated supply lines 30 and 32 downstream of the valves 31 and 33 which are closed. The oxidizer pump 10 is designed for a maximum feed pressure of, for example, 500 atm., and the fuel pump 11 is designed for a maximum feed pressure of about 350 atm. At this stage of the operation, the turbine pump drive operates steadily. The supply of the propellant components to the chamber 25 from the pumps 10 and 11 can therefore be controlled by valves 35 and 37 which are in the form of throttles. Overspeed running of the two turbine pumps is precluded in any event.

The ignition chamber gas which is discharged from the turbine 6 flows through the main combustion chamber 2 and the thrust nozzle 3 and is discharged through the thrust discharge 3a without pressure and it heats all of the associated parts as it flows therethrough including the precombustion chamber 4 and the turbine 6. After a defined temperature of about 150°C is reached, for example, in the main combustion chamber 2, the shut-off valve 16 is operated to connect the oxidizer pump 10 so that it directs the oxidizer through the cooling channel 17. The nitrogen tetroxide flows while it evaporates through the cooling channel 17 to the collecting head 17', the connecting line 18 and into the precombustion chamber 4 and in so doing, it becomes mixed in the precombustion chamber oxidizer section 5a with ignition chamber gas to provide a better mixture preparation. From the precombustion chamber 4 this mixed gas passes into the turbine 6 and thence into the main combustion chamber 2.

At approximately the same time, the shut-off valve 23 is opened to connect the pressure line 22a of the fuel pump 11 so that liquid-fuel is discharged through the grid 8 into the main combustion chamber 2. The fuel in the form of un-symmetrical dimethyl hydrazine is released in the main combustion chamber to react with the nitrogen tetroxide. During this pure main combustion chamber operation, the pressure in the main combustion chamber 2 rises to about 20 atm., for example, and the pressure in the precombustion chamber 4 rises to about 22 atm, for example. By regulation of the ignition chamber 25, it is possible at this phase of the operation to adjust the thrust level in a small range.

The connecting in of the precombustion chamber 4 is effected by opening the shut-off valve 24 to connect to the fuel pump discharge as soon as a sufficient main chamber pressure and sufficient pressure difference between the fuel pump 11 and the precombustion chamber 4 has been obtained.

When the propellant supply of the ignition chamber 25 from the pumps 10 and 11 is controlled by fixed throttles instead of regulating valves, such as valves 35 and 37, there is the possibility of an ignition chamber operation in the engine control range up to the full load point of the operation of the engine. Such a measure is suggested by the support of the oxidizer preparation in the precombustion chamber injector head 5 by admixture of the ignition chamber gas. If necessary, the ignition chamber 25 can, of course, be separated from the precombustion chamber 4 by shutting the valve 27 in the outlet 26 after the combustion has first been terminated in the chamber 25 by closing off the valve 37 in the supply line 36 and also after the oxidizer supply has been stopped by closing off the shut-off valve 35 in the oxidizer supply line 34. If the ignition chamber 25, which is thus rendered inoperative, is further scavenged while the engine is running with gaseous nitrogen from the tank 38 through the line 42, re-ignition of the rocket engine 1 is possible immediately after the end of the combustion.

While a specific embodiment of the invention has been shown and described in detail to illustrate the application of the principles of the invention, it will be understood that the invention may be embodied otherwise without departing from such principles.

What is claimed is:

1. A method of starting a liquid-propellant rocket engine of the "main stream" type having at least one precombustion chamber, a main combustion chamber, a turbine located in the flow path of generated gases between the two combustion chambers, and turbine driven fuel and oxidizer pumps which are driven by the turbine to supply the respective propellant components and particularly for a regeneratively cooled engine, comprising directing propellant components into an a separate starting chamber and igniting them to produce gases, directing the gases through the precombustion chamber, the turbine and the main combustion chamber to preheat them and to run the turbine and drive the propellant component pumps, and preventing flow of propellant components to the precombustion chamber until after the pumps come up to an operating speed, discharging the propellant components from the pumps to said precombustion chamber and said main combustion chamber to produce propellant gases in the preheated main combustion chamber.

2. A method of starting a liquid-propellant rocket engine, according to claim 1, including supplying propellant components to said ignition chamber from auxiliary tanks by means of a pressure gas to force the components into the ignition chamber, and after a predetermined operation of the turbine, discharging the propellant components from the pumps into the ignition chamber.

3. A method of starting a liquid-propellant rocket engine, according to claim 1, including intermixing propellant components with the gases from the ignition chamber which are directed into said precombustion chamber.

4. A method of starting a liquid-propellant rocket engine, according to claim 1, wherein a portion of one of the propellant components is directed into cooling association with the walls of the main combustion chamber and thereafter delivered to said precombustion chamber.

5. A method of starting a liquid-propellant rocket engine, according to claim 1, wherein substantially all of the oxygen propellant component is directed into said precombustion chamber after it has been intermixed with the gases from said ignition chamber to form oxygen-rich gases in the precombustion chamber and including directing fuel propellant components into the main combustion chamber downstream of the turbine for reaction with the gases which are directed from the precombustion chamber through the turbine and into the main combustion chamber.

* * * * *